Figure 1:
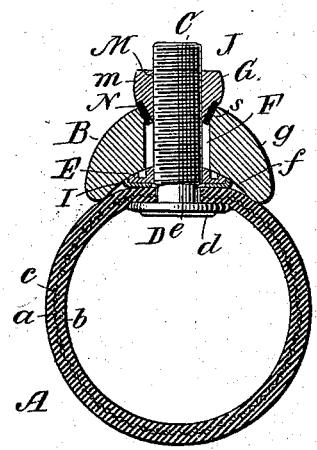

(No Model.) 2 Sheets—Sheet 1.

G. H. F. SCHRADER & H. P. KRAFT.
FASTENING FOR TIRE VALVES.

No. 552,722. Patented Jan. 7, 1896.

WITNESSES:
Fred White
C. K. Fraser

INVENTORS:
George H. F. Schrader & Henry Phillip Kraft,
By their Attorneys,
Arthur C. Fraser (No Model.) 2 Sheets—Sheet 2.
G. H. F. SCHRADER & H. P. KRAFT.
FASTENING FOR TIRE VALVES.
No. 552,722. Patented Jan. 7, 1896.
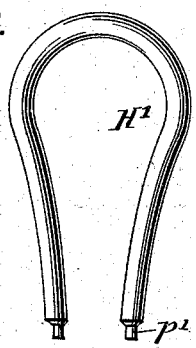
FIG. 9.
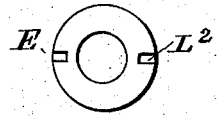
FIG. 12.
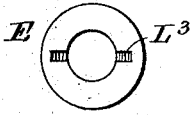
FIG. 15.
FIG. 13.
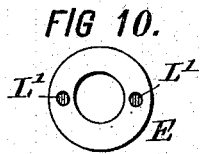
FIG. 10.
FIG. 16.
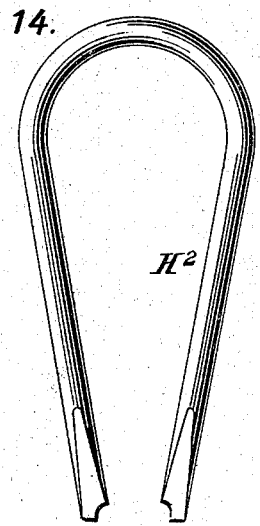
FIG. 14.
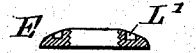
FIG. 11.
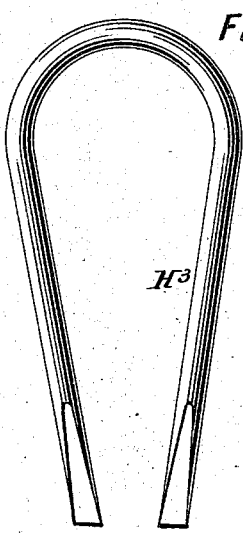
FIG. 17.
FIG. 18.
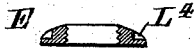
FIG. 19.
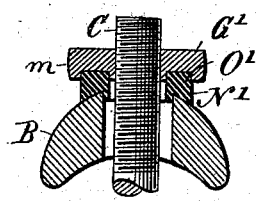
FIG. 20.
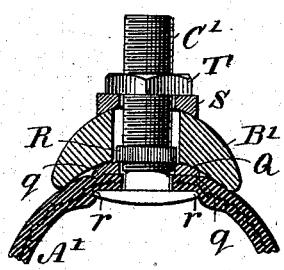
FIG. 22.
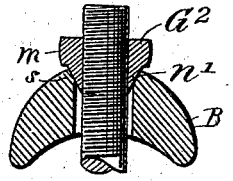
FIG. 21.
WITNESSES:
Fred White
C. K. Fraser.
INVENTORS:
George H. F. Schrader and Henry Phillip Kraft,
By their Attorneys,
Arthur C. Fraser & Co.

UNITED STATES PATENT OFFICE.

GEORGE H. F. SCHRADER AND HENRY PHILLIP KRAFT, OF NEW YORK, N. Y.; SAID KRAFT ASSIGNOR TO SAID SCHRADER.

FASTENING FOR TIRE-VALVES.

SPECIFICATION forming part of Letters Patent No. 552,722, dated January 7, 1896.

Application filed April 28, 1894. Serial No. 509,314. (No model.)

*To all whom it may concern:*

Be it known that we, GEORGE H. F. SCHRADER and HENRY PHILLIP KRAFT, citizens of the United States, and residents of the city, county, and State of New York, have invented certain new and useful Improvements in Fastenings for Tire-Valves, of which the following is a specification.

This invention relates to fastenings for securing air-valves to the rubber tires and to the rims of bicycle-wheels. Heretofore much difficulty has been experienced in properly effecting this fastening. It has been attempted to fasten the tubular valve member to the tire by passing a washer over the member and then screwing down a wrench-nut to clamp this washer against the tire and compress the latter between it and the usual end flange of the valve member. This is accompanied by great liability to cut the tire through by screwing the wrench-nut down too tightly. To reduce this difficulty a recent construction has been employed, consisting of a slender knurled finger-screw on the tubular stem for forcing down the washer, but with this there is great difficulty in making a tight joint, because of the inability to screw down the finger-screw sufficiently tight with the fingers. With the latter construction, to prevent rattling of the valve in the rim, a bridge-washer has been slipped over the stem until its points bore on the rim and then a wrench-nut screwed down on top of this washer, thus drawing the stem through the rim until held tight. With this fastening it is found that unskilled persons screw the wrench-nut down so tightly that the lower end of the valve-stem is drawn against the concave periphery of the rim until the slender top of the washer on the tire which strikes at its two sides on the face of the rim is bent against the rubber at these two points with sufficient force to cut the tire here, while at other points it is unbent. There is nothing to indicate that the fastening is sufficiently tight, and with the aid of a wrench any ordinary person can practically destroy the fastening between the valve and tire. When the inner rubber surface of the tire has once been punctured, the compressed air therein enters the central canvas layer of the tire and permeates through the interstices thereof until a point is reached where an exit in the outer rubber layer exists, whereupon this air escapes through such exit, which may be at any point of the length of the tire. While this leak may be so serious as to prevent practical use of the tire, it is exceedingly difficult to locate or repair, for the reason that its external point gives no indication of the location of the internal defect where the tire must be repaired to prevent leakage.

Our invention aims to provide an improved fastening between the tire and valve-tube and an improved fastening between the valve-tube and rim, which fastenings may be used either together or separately, and when used together will insure a perfect air-tight joint in the first instance and a rattle-proof joint in the second instance without any danger of impairment at either fastening by the application of excessive force. To accomplish this according to the preferred form of our invention, we provide a thin washer-like screw-threaded nut screwing on the stem against the tire and constructed with special notch provisions adapted particularly to a special driving-tool, said end having a full uninterrupted under face which takes against an extremely thin flexible sheet-metal washer having upturned edges and bearing directly on the tire; and we provide a special screw-driving tool, preferably yielding or elastic to such extent that when excessive force is applied to it its tendency is to yield and free itself from the peculiarly-arranged notch provisions in the nut, which driver operates axially of and embraces the valve-tube, thereby preventing a great leverage on the nut in its use; and for fastening the valve relatively to the rim we provide a finger-nut, preferably beveled on its acting face to properly seat itself in the valve-socket and make a tight grip therewith when screwed up, which nut we prefer to construct with a washer-socket carrying a washer engaging the face of the rim and making a water-tight joint between the nut and the latter. As this nut is a finger-nut, the force with which it can be screwed home is limited by the power of the user's fingers, which power is never sufficient to distort or impair any of the parts of the valve or tire, while ample to give a tight fastening between the valve and rim.

Figure 2:
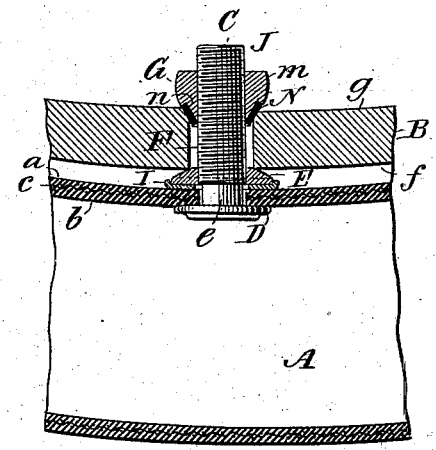
Figure 3:
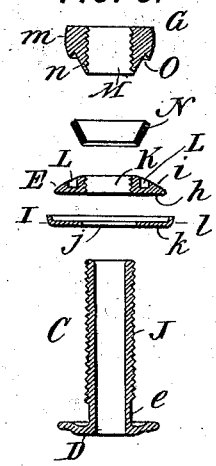
Figure 4:
Figure 7:
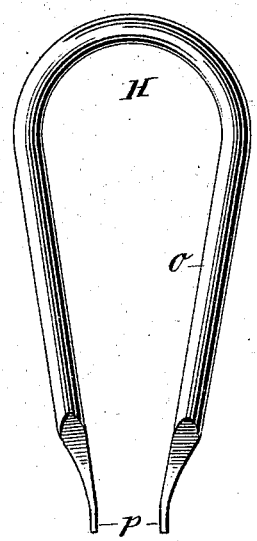
Figure 5:
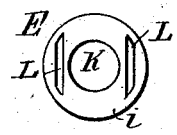
Figure 8:
Figure 6:

In the accompanying drawings, which illustrate certain adaptations of our invention, Figure 1 is a cross-section of a tire and rim provided with the preferred construction of our improved valve-fastening. Fig. 2 is a fragmentary longitudinal section thereof. Fig. 3 is a view of the several parts of the fastening separated and in axial mid-section. Fig. 4 is an elevation of the rim-nut alone. Fig. 5 is a plan view of the tire-nut. Fig. 6 is a plan view of the washer. Fig. 7 is a side elevation of the screwdriver for this nut, and Fig. 8 is an end view of such driver. Figs. 9, 10, and 11 illustrate a modified construction of nut and tool, Fig. 9 being an elevation of the tool, Fig. 10 a plan view of the nut, and Fig. 11 an axial section thereof. Figs. 12, 13, and 14 are respectively a plan view of the nut, an axial section thereof, and an elevation of the tool constructed according to another modification. Figs. 15, 16, and 17 show respectively a plan view of the nut, an axial section thereof, and an elevation of the tool therefor embodying another modification. Fig. 18 is a plan view of the nut, and Fig. 19 an axial section thereof constructed according to another modification. Fig. 20 is a fragmentary cross-section of the rim and valve-tube, showing a modified construction of rim-nut. Fig. 21 is a similar view showing another modification, and Fig. 22 is a fragmentary cross-section showing one old style of fastening between the valve and tire and between the valve and rim.

Referring to all the drawings, let A indicate the tire, B the rim, C the valve, D the tire-flange thereof, E the tire-nut, F the valve-socket in the rim, G the rim-nut, and H the screwdriver.

The tire A shown is the usual single rubber-tube tire, composed of outer rubber face $a$, inner rubber face $b$, and intermediate canvas web $c$, the tire being a complete tube perforated at $d$ to receive the reduced cylindrical neck $e$ of the valve-tube C. The tire may be cemented to the rim or otherwise fastened thereto in any suitable manner.

The rim B is the usual wooden rim having a concave outer periphery $f$, a convex inner side $g$, and a radial valve-socket F.

The valve member C is of the usual tubular construction, having a cylindrical screw-threaded shank J passing through the socket F, a reduced cylindrical neck $e$, and the tire-flange D at its lower end embracing the inner face of the tire.

The tire, rim and valve thus far described may be of any known or suitable construction, those described being in common use.

According to our invention we provide improved means for clamping the valve to the tire, utilizing for this purpose an improved tool-operated tire-nut E, which is a disk-shaped thin washer-nut, having a central screw-threaded perforation K screwing on the threaded shank J of the valve, and preferably constructed with a substantially flat circular bottom face $h$, a convex top face $i$, and tool-notches L adapted to be engaged by a special tool H for operating the nut, formed in the top face of the nut and not extending entirely through its body. The convex top of the nut is designed to conform as nearly as possible to the convex periphery $f$ of the rim, and seats against this periphery when the valve and tire are in position on the rim. When screwed home the nut clamps the tire tightly between itself and the flange D of the valve.

According to one feature of improvement an intermediate washer I, having a central perforation $j$ passing freely over the shank of the valve, a thin flexible flat portion $k$, corresponding in size with the diameter of the washer-nut E, and an upturned flange or edge $l$ embracing the edges of this washer-nut, is provided between the nut and tire. This washer permits the facile screwing down of the nut, relieves the tire from frictional contact with the nut, and provides a curved or beveled surface guarding the tire from the edges of the nut. It also prevents twisting of the tire with the application of the nut, which twisting tends to unscrew the latter under the vibration of the wheel.

Another feature of the invention consists in an improved fastening device for clamping the valve to the rim. In this respect we provide a fastener-nut G, having a central screw-threaded aperture M screwing on the shank J, and an external knurled portion $m$ adapted to be grasped by the fingers, which nut when screwed against the inner face $g$ of the rim draws the shank of the valve through the rim until after the valve and tire are firmly seated in the concave periphery of the rim, whereupon the nut cannot be further rotated to exert an undue indrawing force on the valve, because of the limit of strength in the fingers of the person applying it. Preferably the rim-nut G is adapted to firmly seat itself against the rim and make a water-tight joint between itself and the valve-socket in the latter. This is best accomplished in the construction shown in Fig. 1, in which the nut is constructed with a taper or bevel portion $n$ entering the socket F, and adapted to find its best seat therein as the nut is screwed home, and by providing a yielding washer, preferably of leather or other suitable like material N, preferably seated in a washer-socket O in the face of the nut, and interposed between the latter and the rim. This washer when the nut is screwed home conforms itself to the contour of the rim and makes a noiseless and waterproof joint between the valve and rim. The washer is preferably coned, and the bottom of the socket-hole consists of the conical wall of the taper $n$ of the nut.

The washer-nut E must according to this invention be a tool-nut—that is, one requiring the use of a tool to apply or remove it. Preferably it is constructed to require ordinarily the use of a special driving-tool H, and this tool is preferably constructed of a slightly-elastic loop-shaped handle portion $o$ and peculiar working points $p$. In the preferred construction these points consist of elongated parallel heads of greater length than their width, which heads fit into correspondingly-shaped tool-grooves L in the upper face $i$ of the nut E. These grooves L are arranged diametrically opposite on each side of the aperture K of the nut, traverse the latter through less than its entire depth, and are rectilinear at their bottoms, so that their length is dependent on the convexity of the top face, and they are endless or open-ended. With these grooves and this special tool it is essential that the tool, in order to effectively grasp the nut, shall be held parallel with the axis of the shank of the valve, and that the heads $p$ shall embrace this shank when in the grooves. In this position no excessive force can be applied through the tool to the grooves, since the leverage thus attainable is comparatively slight, for one reason, and since the tool, because of its yielding or elastic nature, will temporarily distort and disengage itself from the nut under a great force. The peculiar disposition of the notches facilitates this distortion, tending to separate the heads $p$ of the tool, and the convexity of the face $i$ of the nut tends when the tool distorts to cause its heads to ride up out of the notches L. In this way the nut can be screwed tightly enough to insure a perfect air-tight connection with the tire, but cannot possibly be screwed tight enough to cut the latter.

The notches L are preferably constructed to permit of sufficient turning to make a temporary air-tight joint with any ordinary flat implement. For example, should the valve become loosened on the road the nut may be set up temporarily by putting the end of an ordinary screwdriver in one notch, or by using the end of a nail or a piece of wire, and such setting up will maintain the joint tight for a short run of the wheel, and at least sufficient to permit its removal to a proper repair-shop, where the joint can be permanently adjusted with the special tool.

The tool-notches in the nut E are constructed according to slight modifications in the constructions shown in Figs. 10, 12, 15, and 18. In Fig. 10 the notches (lettered L') are cylindrical holes, and the tool has correspondingly-cylindrical heads $p'$. In Fig. 12 the notches $L^2$ are radial and disposed at the outer edges of the nut. In Fig. 15 the notches $L^3$ are likewise radial, but located at the inner edges of the nut. In Fig. 18 the notches consist of cross-recesses $L^4$ in the edges of the nut.

The tool $H^2$ is adapted for the nut shown in Fig. 12, the tool $H^3$ for that shown in Fig. 15, and any ordinary wrench or the tool H (shown in Fig. 7) may be employed for the nut shown in Fig. 18.

The rim-nut may, if desired, be employed without the bottom taper. Such construction is shown in Fig. 20, where the nut, here lettered G', is a knurled finger-nut having a washer-socket O' in its face, in which a ring-washer N' is seated. This washer embraces the adjacent face of the rim and makes a water-tight and noiseless joint when the nut is screwed tight.

In some instances a washer may be omitted for the rim-nut and the taper alone employed. Such a construction appears in Fig. 21, where the nut lettered $G^2$ is a finger-nut having a conical taper $n'$ on its under face, which rides into the valve-socket in the rim.

Fig. 22 shows a former construction for the purpose of more clearly illustrating the present improvements. In this construction the tire A', the rim B', and the valve C' are like those described with reference to Fig. 1, but here a loose metal washer Q is slipped over the shank of the valve, and the separate finger-nut R screwed against the washer to clamp the valve to the tire and to fasten the valve to the rim. A bridge-washer S is slipped over the shank, and the wrench-nut T screwing on the shank forces this washer S against the rim. In this construction the finger-nut R must be very thin to pass into the valve-socket, and it is impossible to screw it down tightly enough to effect a permanent air-tight connection. Again, the wrench-nut T is liable to be screwed so tightly that the valve is drawn up through the rim to such extent that the edges $q$ of the washer Q are bent downwardly at the sides where they bear on the rim, thus forcing the rubber tires so tightly against the corresponding points $r$ of the flange of the valve that the inner rubber coating of the tire is liable to be cut and cause a leak. This undue force also destroys the utility of the washer Q, since when it is once distorted it cannot be again used.

In using our improved fastening the valve C, after being placed in the tire, first receives the washer I, and then the threaded tool washer-nut E, the latter being screwed down with the tool H until a firm tight fastening is obtained between the valve and tire. Then the shank of the valve is passed into the socket F, and the finger-nut G, with its washer N, is applied, and screwed down as tightly as it can be with the fingers. This makes a noiseless and water-tight joint at this point, and, by reason of the intimate and extensive contact between the nut and washer and the rim, unscrewing is prevented.

It is impossible to so forcibly apply the washer-nut E as to cut the tire, and as it is impossible to apply great force to the finger-nut G the valve cannot be drawn through the rim far enough to distort the washer-nut E or to impair the tire itself. With this invention the fastening between the valve and tire requires practically no more room than has heretofore been occupied by the outer washer Q alone. All auxiliary nuts are avoided, and the necessity of providing space for such nuts in the valve-socket is consequently obviated. The weight of this fastening is accordingly reduced, as is also that of the fastening between the valve and rim, since the bridge-washer commonly employed is dispensed with and the weight of the finger-nuts may be less than that of the wrench-nut formerly employed.

Any person can easily fasten the valve to or remove it from the rim, but the disconnection of the valve from the tires is by this invention rendered so difficult as to discourage an attempt in this direction on the part of an unskilled person. This is a desirable feature, for the reason that there is rarely occasion for such disconnecting by such persons, and that frequently the result of such an operation is disastrous to the proper reassembling and subsequent operativeness of the parts. To remove the tire from the rim, however, is a matter of frequent requirement, and hence it should be made easy of accomplishment.

Preferably the inner end of the socket F is beveled at $s$, when a conical or tapering nut G or a washer N is employed, as this gives a more extensive bearing and gripping surface for the movable parts.

What we claim is—

1. In fastenings for tire valves, the tire A, and screw threaded valve member C, having flange D, in combination with a thin metal washer I having a central perforation passing over said member, a smooth bottom face, and upturned outer edge and a washer nut having a central screw threaded aperture screwing on said member, of less diameter than said washer I and seating within the upturned edges thereof when screwed home, and having tool notches for receiving a screw driving tool.

2. In fastenings for tire valves, the tire, a valve carried thereby and having a screw-threaded shank, and the rim having a socket through which said shank passes, in combination with a nut having a beveled washer socket and screwing on said shank, and a washer in said socket embracing the inner face of said rim when said nut is screwed home, as and for the purpose set forth.

3. In fastenings for tire valves, the tire, a valve carried thereby and having a screw-threaded shank, and the rim having a socket through which said shank passes, said socket constructed with a beveled end at the inner face of the rim, in combination with a nut screwing on said shank at the inner face of said rim, and having a tapered end entering and seating in the beveled portion of said socket and clamping said valve to said rim and a yielding washer between said nut and rim, as and for the purpose set forth.

In witness whereof we have hereunto signed our names in the presence of two subscribing witnesses.

GEORGE H. F. SCHRADER.
HENRY PHILLIP KRAFT.

Witnesses:
GEORGE H. FRASER,
CHARLES K. FRASER.